United States Patent Office 2,761,858
Patented Sept. 4, 1956

2,761,858
RECOVERY OF 1,2,4,5-TETRAMETHYLBENZENE FROM A HYDROCARBON FRACTION

William P. Hettinger, Jr., Dolton, and John W. Teter, Chicago, Ill., assignors to Sinclair Refining Company, New York, N. Y., a corporation of Maine No Drawing. Application February 9, 1953,
Serial No. 336,012

12 Claims. (Cl. 260—96.5)

Our invention relates to the preparation of 1,2,4,5-tetramethylbenzene, a compound commonly known as durene.

It is known in the art to prepare hydrocarbon fractions of high aromatic content by the catalytic hydroforming of naphtha or by other conversion methods such as alkylation or isomerization. It is also known in the art to separate durene from the hydrocarbon fractions produced in such processes. Thus, United States Patent No. 2,560,373 to Schmidl describes the separation of durene from hydroformate by chilling a hydroformate fraction boiling within the range between about 380° and 390° F. to between about 0° and 32° F. to cause the precipitation of durene crystals of about 80 per cent purity.

In accordance with our present invention we have discovered a new method whereby durene can conveniently be separated from hydrocarbon fractions. Thus, we have discovered that durene, when present as a constituent in such fractions, forms with thiourea an adduct of complex from which the durene can be recovered in a purified form. Thus the process of our invention involves reacting the durene present in the hydrocarbon fraction with thiourea, thereby forming a solid durene-thiourea complex, and then decomposing the complex in order to regenerate the durene.

As a specific illustration of the manner in which our process can be carried out, a Santa Barbara naphtha having the following distillation analysis:

|  | ° F. |
|---|---|
| Initial boiling point | 243 |
| 10 per cent | 266 |
| 50 per cent | 302 |
| 90 per cent | 357 |
| End point | 379 | and having an API gravity of 49.0° and analyzing 37.4 per cent paraffins, 0.9 per cent olefins, 40.6 per cent naphthenes and 21.1 per cent aromatics was subjected to a conventional hydroforming operation. The liquid hydroformate was then subjected to fractionation, six cuts boiling within the ranges 369–374° F., 374–380° F., 380–385° F., 385–390° F., 390–396° F., and 396–400° F. being taken, respectively. Each of these cuts amounted to 0.98 volume per cent and 1.1 weight per cent, based upon the feed to the fractionating column. Table I sets forth the approximate melting points of these cuts, and also sets forth other pertinent information concerning the cuts.

Table I

| Cut | B. P., ° F. | Percent Aromatics, Vol. Percent | Percent $C_{10}$ Aromatics | Approx. M. P. of cut, ° C. | Est. Percent Durene (A) | Est. Percent Durene (B) |
|---|---|---|---|---|---|---|
| 9 | 369–374 |  |  | very low |  |  |
| 10 | 374–380 | 94 | 66 | 0–3 | 6 | 10–15 |
| 11 | 380–385 | 96.5 | 71 | 20–25 | 25 | 25 |
| 12 | 385–390 | 97.5 | 66 | 20–25 | 20 | 25 |
| 13 | 390–396 | 97.5 | 42 | −5–0 | 5 | 10–15 |
| 14 | 396–400 |  |  | very low |  |  |

(A) Based on mass spectrograph analysis of $C_{10}$ aromatics and the ratio of durene to other $C_{10}$ aromatics as reported in Pet. Div., ACS Milwaukee Meeting 1952, page 157.
(B) Based on melting point diagram, Smith and MacDaugall, J. A. C. S., 51, 3006 (1929).

Based on analytical method (A), cuts 10, 11, 12 and 13 contained a total of 14 per cent of durene and the total hydroformate contained 0.56 volume per cent of durene, and based on analytical method (B) cuts 10, 11, 12 and 13 contained 19 per cent of durene and the total hydroformate contained 0.75 volume per cent of durene.

Equal parts by weight of cuts designated 10, 11, 12, and 13 (35.2 grams) was admixed with 200 mls. of a methanol solution containing 40 grams of thiourea at a temperature of 40° C. The mixture was then cooled to approximately 6° C. A precipitate was obtained which was separated from the supernatant liquid by filtration. The solid was washed slightly with cold water, and then decomposed with hot water. Upon cooling, a solid floated to the top, and was recovered. This solid represented 14 per cent by weight of the initial feed. It had the characteristic durene odor, and melted at approximately 53° C. If desired, the durene can be further purified by reacting it with a solution of thiourea and methanol to form a second precipitate from which the durene can be regenerated by mixing the precipitate with hot water in the manner just described.

We have prepared the adduct of durene and thiourea as follows:

33⅓ parts by volume of a mixture composed of 80 per cent by volume of toluene and 20 per cent by volume of durene and 66⅔ parts by volume of a 38 per cent by weight solution of thiourea in methanol were mixed. When this was done the reaction mixture when at room temperature contained a precipitate. The precipitate was filtered off and washed with a small amount of cold methanol, after which the precipitate was allowed to dry. The precipitate analyzed 36.3 per cent by weight of carbon, 30.1 per cent by weight of sulfur and 26.1 per cent by weight of nitrogen. The chemical analysis of the precipitate showed an excess of carbon and a deficiency of sulfur and nitrogen, indicating that the precipitate was not pure thiourea. Assuming the excess carbon to have come from durene, the ratio of thiourea to durene present in the precipitate was 3.4:1. X-ray patterns were also obtained on durene, thiourea and the precipitate and they showed that the X-ray pattern of the precipitate was different from the durene and thiourea patterns. The precipitate was needle-like in appearance.

The precipitate was thereafter decomposed by mixing 5 parts by weight of it with 95 parts by weight of water at a temperature of about 85–90° C. When this was done a liquid floated to the surface, and upon cooling the mixture to room temperature the liquid solidified to a solid having a melting point substantially identical with that of the durene used as a starting material.

The art is well aware of methods for the production of hydrocarbon fractions of high aromatic content by the use of conversion processes such as alkylation, isomerization and hydroforming, the last process involving contacting naphtha or a naphtha cut of high naphthene content with a suitable catalyst at an elevated temperature in the presence of hydrogen. Generally the feed inlet temperature to the reactor varies within the range from about 850° to about 1000° F. and the reactor pressure is generally within the range from about 150 to about 1000 p. s. i. g. and preferably from about 200 to about 600 p. s. i. g. The molecular ratio of hydrogen to hydrocarbon present in the reactor feed generally varies from about 2:1 to 15 or 20:1 and the liquid hourly space velocity is generally within the range from about 0.5 to 10.

A wide variety of catalysts can be used in the hydroforming process. Thus satisfactory catalysts for use in hydroforming naphtha can comprise major portions of aluminum oxide and minor portions of the oxides and sulfides of vanadium, molybdenum, chromium, tungsten and nickel. The aluminum oxide incorporated in the catalyst can be used in various forms, such as activated alumina, bauxite, aluminum hydroxide, alumina gels and peptized alumina gels. Examples of catalysts which can be used in hydroforming are alumina or peptized alumina gels containing from 1 to 20 per cent by weight of molybdenum oxide or chromium oxide. Platinum or palladium supported on silica-alumina can also be used as a catalyst. The hydroforming operation can be carried out using a fixed-bed catalyst or with the catalyst in a fluidized state.

The hydrocarbon fraction containing the durene reacted with the thiourea to form the complex should preferably boil within the range from about 375 to about 395° F. and the complex is formed and decomposed in a manner similar to that heretofore used in connection with thiourea-hydrocarbon complexes. For example the thiourea is preferably employed in solution in a lower monohydric alcohol such as methanol or in water or in aqueous mixtures containing a lower monohydric alcohol.

We claim:

1. A solid complex of 1,2,4,5-tetramethylbenzene and thiourea.

2. In the recovery of 1,2,4,5-tetramethylbenzene from a hydrocarbon fraction, the step of admixing the hydrocarbon fraction with a thiourea solution thereby forming a solid complex of the 1,2,4,5-tetramethylbenzene and the thiourea.

3. In the recovery of 1,2,4,5-tetramethylbenzene from a hydrocarbon fraction, the step of admixing the hydrocarbon fraction with a solution of thiourea in methanol thereby forming a solid complex of the 1,2,4,5-tetramethylbenzene and the thiourea.

4. In the recovery of 1,2,4,5-tetramethylbenzene from hydroformate, the step of admixing the hydroformate with a thiourea solution thereby forming a solid complex of the 1,2,4,5-tetramethylbenzene and the thiourea.

5. In the recovery of 1,2,4,5-tetramethylbenzene from hydroformate, the step of admixing the hydroformate with a solution of thiourea in methanol thereby forming a solid complex of the 1,2,4,5-tetramethylbenzene and the thiourea.

6. A method for the recovery of 1,2,4,5-tetramethylbenzene from a hydrocarbon fraction which comprises admixing the hydrocarbon fraction with a thiourea solution thereby forming a solid complex of the 1,2,4,5-tetramethylbenzene and the thiourea and thereafter decomposing the complex in order to form 1,2,4,5-tetramethylbenzene in a purified form.

7. A method for the recovery of 1,2,4,5-tetramethylbenzene from a hydrocarbon fraction which comprises admixing the hydrocarbon fraction with a solution of thiourea in methanol thereby forming a solid complex of the 1,2,4,5-tetramethylbenzene and the thiourea and thereafter decomposing the complex in order to form 1,2,4,5-tetramethylbenzene in a purified form.

8. A method for the recovery of 1,2,4,5-tetramethylbenzene from hydroformate which comprises admixing the hydroformate with a solution of thiourea thereby forming a solid complex of the 1,2,4,5-tetramethylbenzene and the thiourea and thereafter decomposing the complex in order to form 1,2,4,5-tetramethylbenzene in a purified form.

9. A method for the recovery of 1,2,4,5-tetramethylbenzene from hydroformate which comprises admixing the hydroformate with a solution of thiourea in methanol thereby forming a solid complex of the 1,2,4,5-tetramethylbenzene and the thiourea and thereafter decomposing the complex in order to form 1,2,4,5-tetramethylbenzene in a purified form.

10. A method for the recovery of 1,2,4,5-tetramethylbenzene from a petroleum fraction boiling within the range from about 375 to about 395° F. which comprises admixing the petroleum fraction with a solution of thiourea thereby forming a solid complex of the 1,2,4,5-tetramethylbenzene and the thiourea and thereafter decomposing the complex in order to form 1,2,4,5-tetramethylbenzene in a purified form.

11. A method for the recovery of 1,2,4,5-tetramethylbenzene from hydroformate boiling within the range from about 375 to about 395° F. which comprises admixing the hydroformate with a solution of thiourea thereby forming a solid complex of the 1,2,4,5-tetramethylbenzene and the thiourea and thereafter decomposing the complex in order to form 1,2,4,5-tetramethylbenzene in a purified form.

12. A method for the recovery of 1,2,4,5-tetramethylbenzene from hydroformate boiling within the range from about 375 to about 395° F. which comprises admixing the hydroformate with a solution of thiourea in methanol thereby forming a solid complex of the 1,2,4,5-tetramethylbenzene and the thiourea and thereafter decomposing the complex with water in order to form 1,2,4,5-tetramethylbenzene in a purified form.

References Cited in the file of this patent

UNITED STATES PATENTS 2,642,424     Gorin et al. _____ June 16, 1953

OTHER REFERENCES

Schiessler, et al.: J. Am. Chem. Soc., vol. 74, No. 7 (April 5, 1952), pp. 1720–3.